Patented June 25, 1929.

1,718,825

UNITED STATES PATENT OFFICE.

ERICH KIRMSE, OF ALTRAHLSTEDT, NEAR HAMBURG, AND WALTER SCHOPPER, OF HAMBURG, GERMANY, ASSIGNORS TO AMERICAN METAL COMPANY, LTD., OF NEW YORK, N. Y., A CORPORATION OF NEW YORK.

PROCESS FOR REMOVING ARSENIC FROM ORES, SPEISS, AND OTHER METALLURGICAL PRODUCTS.

No Drawing. Application filed October 29, 1927, Serial No. 229,788, and in Germany March 3, 1927.

This invention relates to a process of removing arsenic from ores and metallurgical products such, for example, as matte, speiss, flue dust, cement copper rich in arsenic and the like.

It has been the practice heretofore to mix arsenic containing metallurgical products with limited quantities of carbon and pyrites sufficient only to prevent the formation of or to decompose arsenites in the mixture and to heat the mixture in furnaces fired with gas or oil burners. In such operations arsenic is removed only from the surface of the mass which is in contact with the heating gases, the temperature below the surface being too low to effect the desired reactions. Stirring of the mixture does not aid the reaction materially because the heated materials cool rapidly when forced beneath the surface of the mass. Attempts to carry the heat into the body of the mass by increasing the temperature result only in melting or sintering the surface layer and the formation of crusts which further retard the removal of the arsenic. The operation as described is, therefore, relatively slow and expensive, it being necessary often to subject the material to repeated treatments to effect substantial removal of the arsenic content.

It is the object of the present invention to avoid the difficulty hitherto experienced in the treatment of arsenic-bearing materials and to provide a simple and effective process whereby the arsenic can be removed rapidly and with minimum labor and expense. The operation permits a material reduction of the cost of preparing arsenic-bearing material for further treatment and permits the recovery of the arsenic.

The invention depends upon the mixing with the arsenic-bearing material of a sufficient quantity of sulphur-containing and carbonaceous material to produce a self-combustible mass which upon ignition can be burned by supplying air thereto, the operation being carried out, therefore, without recourse to heat supplied from external sources such as gas and oil burners. The heat developed by the combustion is distributed uniformly through the mass, all parts of which are raised to the temperature necessary for the reaction so that the separation of the arsenic proceeds rapidly and effectively. It depends, furthermore, upon the discovery that the separation of arsenic is favored by the presence of an atmosphere of carbon oxy-sulphide which can be produced easily in the operation as described by limiting the amount of air supplied whereas gas and oil burners used for heating heretofore require an excess of air which prevents the development of carbon-oxy-sulphide.

The operation as described can be conducted in various types of furnaces. Advantageously a mechanical roasting furnace of the multi-hearth type is employed. Such a furnace with a plurality of superposed hearths and mechanically operated air-cooled stirring arms permits the progressive travel of the mass through the furnace and continuous operation with comparatively low heat losses. The mixture is fed to the uppermost hearth and passes thence thru the lower hearths by the operation of the stirring arms. The required amount of air is supplied to the bottom of the furnace and the gases evolved and containing the arsenic are withdrawn from the top thereof. Furnaces of large diameter such as are employed commonly in roasting pyrites may be employed. Likewise it is possible to use rotary drum furnaces which are similarly employed in roasting pyrites. Other types of roasting furnaces may be utilized. The gases escaping from the furnace are highly concentrated in arsenic and the latter can be easily condensed and recovered, for example, by means of an electrical precipitator such as the well known Cottrell precipitator.

In carrying out the invention various sulphur-containing materials may be used for admixture with the arsenic-containing material. Preferably iron pyrites are thus used, but in the treatment of cement copper rich in arsenic it is preferable to use elementary sulphur so as to prevent contamination of the cement copper with iron.

Various carbonaceous materials may be used likewise in the admixture. The carbonaceous material should be readily combustible and lignite briquettes or waste or slack coal is the preferred material, although in treating lead-arsenic flue-dust it is advisable to employ lignite briquette dust or saw-dust in order to prevent sintering. Anthracite coal and coke are not usually suitable for the practice of the invention because these fuels are more slowly combustible.

As an example of the operation a mixture may be prepared as follows:

100 parts ground copper-lead-speiss containing:
28% copper, 16% lead, 29% iron, 19% arsenic, 6% antimony, 2% sulphur;
25 parts Spanish pyrites containing 48% sulphur;
20 parts coal slack.

This mixture is delivered to the furnace or supplied continuously thereto if the operation is conducted in a continuous manner and is ignited. Air is supplied to the furnace in sufficient quantity to maintain combustion but the amount of air is limited so that an atmosphere of carbon oxy-sulphide is maintained in the furnace in contact with the mixture. The combustion products including carbon oxy-sulphide and the separated arsenic are withdrawn continuously and may be treated in any suitable manner, for example, by electrical precipitation to separate and recover the arsenic content.

It will be understood that the proportions of the mixture as specified are merely typical and that the proportions employed in treating any given arsenic-containing material will vary depending upon the character thereof and that the amount of fuel required will likewise vary somewhat depending upon the structure of the furnace in which the operation is conducted. By suitable regulation of the proportions of the mixture and by similar regulation of the amount of air supplied to maintain the combustion and the presence of carbon oxy-sulphide in the atmosphere of the furnace, it is possible to rapidly and substantially completely remove arsenic from the mixture in a single roasting operation. The resulting product may contain as little as 2 per cent of arsenic whereas according to the usual practice heretofore the reduction of arsenic to so low an amount has required several roasting operations, that is to say, the repeated treatment of the material with consequent added expense.

Various changes may be made in the details of the operation as hereinbefore indicated without departing from the invention or sacrificing any of the advantages thereof.

We claim:—

1. The process of removing arsenic from ores and metallurgical products, particularly mattes, speiss and copper-arsenic compounds, which comprises mixing such products with a quantity of materials containing sulphur and carbon sufficient to provide a self-combustible mixture, igniting the mixture and maintaining combustion thereof with a limited supply of air to produce an atmosphere of carbon oxy-sulphide in contact with the mixture.

2. The process of removing arsenic from ores and metallurgical products, particularly mattes, speiss and copper-arsenic compounds, which comprises mixing such products with a quantity of sulphides and carbon sufficient to provide a self-combustible mixture, igniting the mixture and maintaining combustion thereof with a limited supply of air to produce an atmosphere of carbon oxy-sulphide in contact with the mixture.

3. The process of removing arsenic from ores and metallurgical products, particularly mattes, speiss and copper-arsenic compounds, which comprises mixing such products with a quantity of iron pyrites and carbon sufficient to provide a self-combustible mixture, igniting the mixture and maintaining combustion thereof with a limited supply of air to produce an atmosphere of carbon oxy-sulphide in contact with the mixture.

4. The process of removing arsenic from ores and metallurgical products, particularly mattes, speiss and copper-arsenic compounds, which comprises heating such products in an atmosphere of carbon oxy-sulphide until the arsenic is substantially removed.

5. The process of removing arsenic from ores and metallurgical products, particularly mattes, speiss and copper-arsenic compounds, which comprises maintaining self-combustion of a mixture of such products with materials containing carbon and sulphur with a limited supply of air to produce an atmosphere of carbon oxy-sulphide in contact with the mixture.

6. The process for the de-arsenification of ores and metallurgical products, particularly mattes, speiss, cement-copper with arsenic and the like, characterized by the feature that sulphur and carbon-containing substances are added to the charge in such amounts that the charge on heating becomes self-combustible without further application of heat, and that the supply of air to the charge is so regulated that a carbon oxy-sulphide atmosphere and simultaneously the reaction temperature are developed within the charge.

In testimony whereof I affix my signature.
ERICH KIRMSE.

In testimony whereof I affix my signature.
WALTER SCHOPPER.